3,128,937
GAS CONSERVING MEANS
Harry W. Evans, 4409 S. Lewis; Dean B. Knight, 3952 S. Delaware Place; and Cecil K. Vandagriff, 7653 E. 7th, all of Tulsa, Okla.
Filed Apr. 27, 1961, Ser. No. 105,943
4 Claims. (Cl. 230—1)

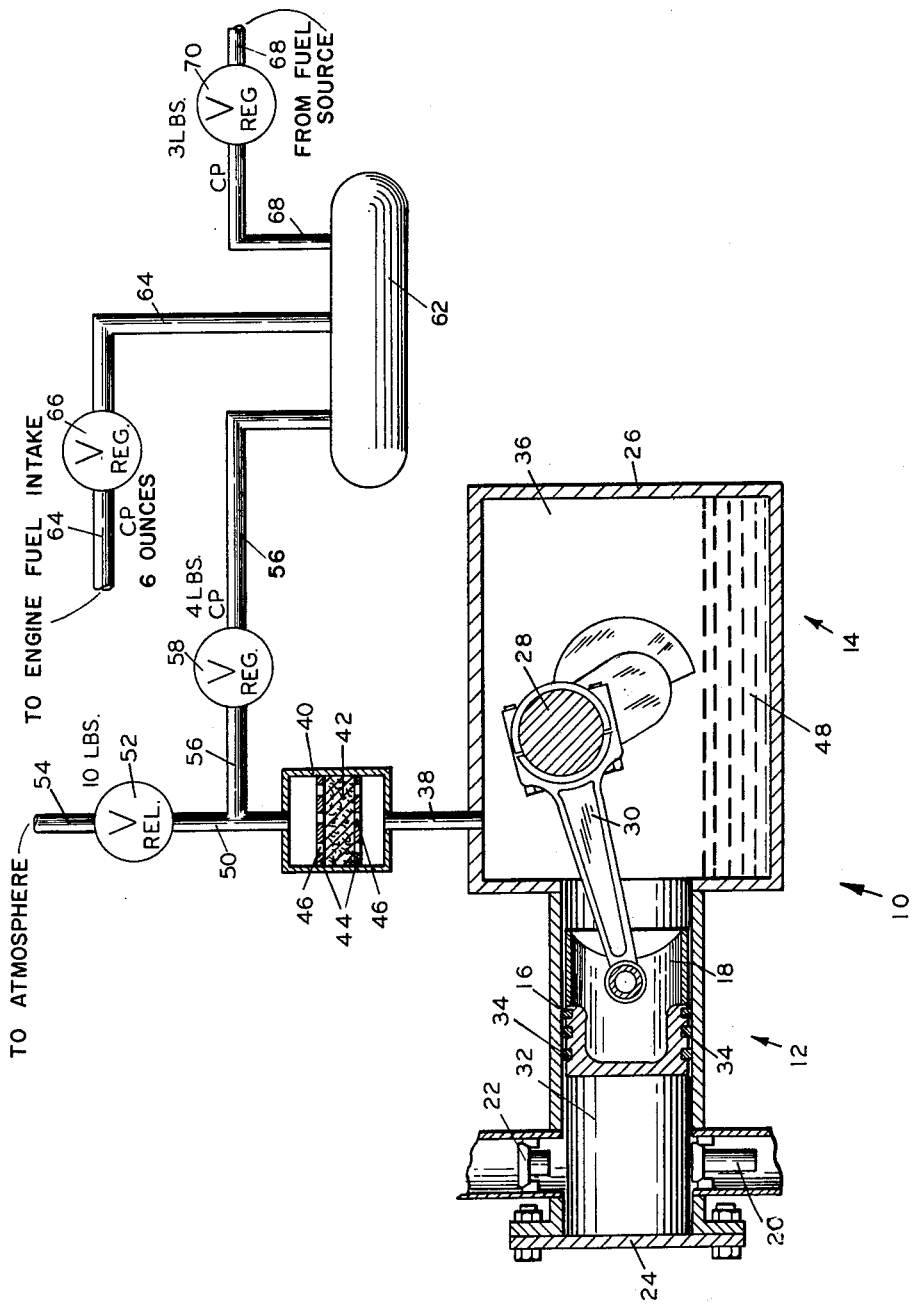
INVENTORS.
HARRY W. EVANS
DEAN B. KNIGHT
CECIL K. VANDAGRIFF
BY Head and Johnson
ATTORNEYS

This invention relates to a means of conserving fuel in gas compressors. More particularly, the invention relates to a method whereby gas which leaks past the piston in positive displacement gas compressors is utilized as fuel for the engine prime mover driving the compressor, whereby the gas leakage is prevented from being wasted.

In the petroleum industry many occasions arise where it is necessary to compress gas. Not only is it necessary to compress gas to move it through pipe lines, but in the processing of gas, such as in the direct manufacture of natural gasoline, gas compressors are utilized. The most effective and commonly used system of compressing gas is through direct, positive compression by reciprocating pistons. These reciprocating pistons actuate in cylinders, drawing gas into the cylinders on the rearward stroke and on the forward stroke compress the gas within the cylinder, causing it to pass out of the cylinder. It is apparent that any arrangement of a piston actuating within a cylinder will result in some leakage of gas past the piston.

Typically, when a new compressor is put into operation, the rings on the piston are not well seated and gas leakage occurs. After the gas compressor has run for a period the rings begin to seat and seal better against the cylinder walls and a minimum gas leakage occurs. Even when the very optimum sealing occurs between the piston rings and the walls of the cylinder, some small gas leakage occurs past the cylinder. This is due to the fact that a gap must exist between the rings on the piston to allow for expansion and contraction and although the rings themselves may seal perfectly against the cylinder walls, some gas leakage inevitably occurs at this gap in the rings.

As the compressor begins to wear away by attrition, reducing the effective sealing between the rings and the piston walls, additional gas leakage occurs. When the gas leakage becomes too great it becomes economically advantageous to stop the compressor and replace the piston rings. The length of time usually elapsing between installing new piston rings and the necessity for replacing them may range from a period of a few months to as high as twenty years or more. In any event, the last portion of the useful life of piston rings occasions higher volumes of gas leakage.

Under present practices gas leaking past the piston rings of a compressor flows into the crankcase housing and out through a vent to the atmosphere. The gas is completely lost and piston rings are usually replaced on an economic basis depending upon the value of the gas being lost. Ordinarily the prime movers used to drive gas compressors are internal combustion gas engines which utilize the same gas being compressed to furnish energy for the compression of the gas.

The present invention contemplates a novel method of conserving fuel in gas compressors. Broadly stated the invention may be defined as: In a gas compressor driven by an engine having connection to a fuel source, said engine having a fuel intake, said compressor having a piston reciprocated in a cylinder and a crankcase compartment in communication with said cylinder, a method of conserving gas which escapes past said piston and into said crankcase compartment; collecting said gas escaping past said piston in said crankcase compartment; directing said collected gas to said engine fuel intake; and regulating the pressure of gas from said fuel source whereby said collected gas is consumed first by said engine.

Another aspect of this invention is the provision of a means whereby gas entering crankcase of a gas compressor may be utilized to provide power for an internal combustion engine prime mover of the gas compressor and wherein, in addition, gas from a fuel source is also provided.

Another aspect of this invention is the provision of a means of utilizing gas which enters the crankcase of a gas compressor in conjunction with the gas flowing from a standard gas fuel source, and wherein the gas entering the crankcase is first utilized and if not available in sufficient quantity then gas from the standard fuel source is automatically directed into the engine.

Another object of this invention is to provide a means of conserving the gas which escapes past the piston in gas compressors whereby the replacement of the cylinder rings of the compressor may be delayed and wherein the gas which is lost past the piston is entrapped and efficiently utilized so that the replacement of piston rings may be delayed.

These and other objects and a better understanding of the invention may be had by referring to the following description and claims when taken in conjunction with the attached drawing, in which:

FIGURE 1 is a schematic view of a typical gas compressor disclosing means whereby gas escaping past the piston is utilized as a fuel for the engine prime mover.

Referring now to the drawing, in cross section, a typical gas compressor is indicated by the numeral 10. Gas compressor 10 is composed of two major portions, being cylinder portion 12 and crankcase portion 14. Cylinder portion 12 consists primarily of cylinder 16, in which is slideably positioned piston 18, inlet valve 20, outlet valve 22, and cylinder head 24.

Crankcase portion 14 consists primarily of crankcase 26 supporting a crankshaft 28. Crankshaft 28 is rotated by an internal combustion prime mover (not shown). Positioned between crankshaft 28 and piston 18 is piston rod 30. As crankshaft 28 rotates, piston rod 30 transmits motion to piston 18 so that piston 18 is oscillated back and forth in cylinder 16. As piston 18 is drawn rearwardly by the rotation of crankshaft 28, the cylinder chamber 32 expands, opening inlet valve 20 and draws gas into the cylinder chamber 32. As piston 18 moves forward the cylinder chamber 32 is diminished, compressing gas entrapped therein, and forcing it out outlet valve 22.

Positioned on piston 18 are piston rings 34 which serve to seal against the walls of cylinder 16. Piston rings 34 prevent gas which is entrapped within cylinder chamber 32, which is under high pressure as piston 18 moves forward from escaping between piston 18 and cylinder 16. Some amount of gas always escapes past piston 18 and into crankcase chamber 36. This gas which does escape past piston 18 into crankcase chamber 36 is usually termed "blow by" gas. Gas which escapes into crankcase chamber 36 is normally vented to the atmosphere in the same manner that crankcases are ventilated in internal combustion engines. It can be seen therefore that under present day systems wherein the gas which escapes past cylinder 16 is vented to the atmosphere that this gas is lost and that as piston rings 34 begin to wear a point is reached where it is economically feasible to replace them, even though such replacement requires the compressor 10 to be completely shut down for a period.

According to the principles of this invention gas which escapes into crankcase chamber 36, instead of being vented into the atmosphere, is utilized in a unique arrangement to furnish fuel for the internal combustion engine prime mover. Crankcase 26 is completely enclosed except for a vent pipe 38. Positioned in vent pipe 38 is a demistor 40. Demistor 40 is constructed in a typical arrangement wherein a fine material, such as steel wool 42, is supported between plates 44 having openings 46 therein. As gas flows from crankcase chamber 36 there will be a certain amount of oil in mist or vapor form entrained therein from the lubricating oil 48 contained within the crankcase 26 and also from lubricating oil which is applied to the cylinders 16. As gas passes through steel wool 42 the droplets of oil accumulate in size and as the size of the droplets become larger fall back through vent pipe 38 into crankcase chamber 36.

The gas, substantially free of oil by demistor 40, flows out of demistor 40 through pipe 50. Affixed to pipe 50 is a relief valve 52. Relief valve 52 is typically set at the pressure of approximately ten pounds. If the pressure within crankcase chamber 36 exceeds ten pounds, then relief valve 52 opens and gas escapes through pipe 54 to the atmosphere. In this manner, even though crankcase chamber 36 is sealed, the pressure within the crankcase chamber 36 will never build up to an amount which would cause damage to gas compressor 10.

Connected to pipe 50 is a return line 56. A regulating valve 58 is positioned in return line 56. Regulating valve 58 is typically set to open at a pressure of four pounds. Return line 56 extends to a fuel volume tank 62.

In a simpler arrangement, return line 56 may extend directly from crankcase chamber 36 to fuel volume tank 62 with regulating valve 58 inserted therein. In this simpler arrangement demistor 40 may be deleted and relief valve 52 may connect to crankcase 36 at any desired point.

The function of fuel volume tank 62 is to accumulate gas immediately before it is fed into the internal combustion engine prime mover, so that a steady and non-fluctuating gas supply is available for best performance of the engine. Regulating valve 58 is set so that at any time the gas pressure within fuel volume tank 62 drops below four pounds per square inch, regulating valve 58 opens and allows fuel to flow from crankcase chamber 36.

A fuel line 64 conducts gas from fuel volume tank 62 to fuel intake of the internal combustion engine prime mover. Positioned in fuel line 64 is a regulating valve 66. Regulating valve 66 is set to reduce the pressure in the fuel line 64 leading to the engine to that prescribed by the engine manufacturers for most efficient operation of the engine. This fuel pressure is usually only six ounces or so of gas pressure.

A fuel supply line 68 connects fuel volume tank 62 to a fuel supply source (not shown). Interposed in fuel supply line 68 is a regulating valve 70. Regulating valve 70 is set to open at approximately three pounds so that when the pressure of gas within fuel volume tank 62 drops below three pounds per square inch regulating valve 70 opens to permit fuel to flow through fuel supply line 68.

*Operation*

When gas compressor 10 is in operation, with piston 18 being reciprocated within cylinder 16, gas is compressed within cylinder chamber 32 and a portion of the compressed gas will leak past piston 18 into crankcase chamber 36. A gas pressure is accumulated in crankcase chamber 36, it passes out through return line 56 and through demistor 40 where it is stripped of droplets of oil. The consumption of gas by the internal combustion engine prime mover, furnishing energy for the rotation of crankshaft 28, reduces the pressure in fuel volume tank 62. When the pressure in the fuel volume tank 62 falls below four pounds per square inch, regulating valve 58 opens and permits gas to flow from return line 56 into the fuel tank 62. This fuel is consumed by the prime mover.

In normal operation it would not be anticipated that enough gas would escape past piston 18 to furnish all of the fuel requirements for the internal combustion engine prime mover. In this event, the gas pressure in fuel volume tank 62 would drop lower than four pounds per square inch and even though regulating valve 58 was opened so that all of the gas entering crankcase chamber 36 is conducted into fuel volume tank 62, the consumption of the engine being greater, then the pressure will continue to drop until the pressure goes below three pounds per square inch. As this point regulating valve 70 opens allowing fuel to flow into fuel volume tank 62 through fuel supply line 68. Fuel supply line 68 connects to a high pressure gas source so that in no event during normal operation, will the gas pressure in fuel volume tank 62 drop below three pounds per square inch.

It can be seen that the arrangement of this invention in a unique way provides a system whereby the fuel required by an internal combustion engine driving a gas compressor is partially supplied by the "blow by" gas escaping into crankcase chamber 36. The arrangement of valves 52, 58, 66 and 70 are such that the escaped or "blow by" gas is first utilized to drive the internal combustion engine. When the piston rings 34 are relatively new so that only relatively small amounts of gas escape past piston 18 then this escaped gas may provide only a relatively small percent, such as 10% or 20%, of the gas consumed by the internal combustion engine. The other 80% to 90% would be supplied through fuel supply line 68. As the piston rings 34 wear and an increase in quantity of "blow by" gas occurs past piston 18 then the percentage of fuel supplied from crankcase chamber 36 increases.

If more gas escapes past piston 18 than is consumed by the internal combustion engine prime mover, then the gas pressure will continue to build up. If it builds up to the regulating pressure of valve 52 then regulating valve 52 will open and the gas will be vented to atmosphere. In this way, the gas pressure within crankcase chamber 36 will never accumulate to a point where injury would occur to the gas compressor 10.

The arrangement of this invention is such that any leakage of gas past piston 18 whatsoever is utilized as fuel, whether such leakage amounts to only a very small percent of the fuel requirements of the engine or even up to 100% of the engine fuel requirements. Under this method, as rings 34 begin to wear and continue to wear to a point where substantial quantities of gas are leaking past piston 18 there will be no economic loss. Only when such leakage exceeds that which the engine prime mover requires does economic loss occur. Piston rings 34 will therefore not have to be replaced near as frequently as is occasioned under present conditions wherein the escaped gas merely is vented to the atmosphere.

This invention has been described establishing certain pressure requirements on the regulating valves 52, 58, 66 and 70. It is understood that these figures are set merely as a means of demonstrating the relative pressures which are involved and that any pressure system may be utilized wherein the relative pressures may be adjusted over wide ranges.

Although this invention has been described with a certain degree of particularity, it manifests that many changes may be made in the detail of construction and the arrangement of components without departing from the spirit and the scope of this disclosure.

We claim:
1. In a combustible gas compressor driven by an engine having connection to a gas fuel source, said engine having a fuel intake, said compressor having a piston reciprocated in a cylinder and a crankcase compartment in communication with said cylinder, a method of conserving combustible gas which escapes past said piston and into said crankcase compartment, comprising; collecting said combustible gas escaping past said piston and into said crankcase compartment; directing said collected combustible gas to said engine fuel intake; and regulating the pressure of gas from said fuel source whereby said collected gas is consumed first by said engine.

2. In a combustible gas compressor driven by an engine having connection to a gas fuel source, said compressor having a piston reciprocated in a cylinder and a sealed crankcase compartment in communication with said cylinder, means of conserving combustible gas which escapes past said piston and into said crankcase compartment comprising, a fuel volume tank; a return line connecting said crankcase compartment with said fuel volume tank; a regulator valve interposed in said return line; a fuel supply line connecting said gas fuel source with said fuel volume tank; a regulator valve interposed in said fuel supply line, said regulator valve in said fuel return line disposed to open as pressure falls in said fuel volume tank before said regulator valve in said fuel supply line opens; and a fuel line connecting said fuel volume tank to said engine.

3. A fuel conserving means according to claim 2 including a demistor means positioned in said return line.

4. A fuel conserving means according to claim 2 including a relief valve means in communication with said crankcase compartment.

References Cited in the file of this patent

UNITED STATES PATENTS

| | | |
|---|---|---|
| 2,354,722 | Walton | Aug. 1, 1944 |
| 2,450,864 | Callaway et al. | Oct. 5, 1948 |
| 2,493,617 | Chubbuck | Jan. 3, 1950 |
| 2,592,380 | Beckett | Apr. 8, 1952 |
| 2,642,052 | Wagner et al. | June 16, 1953 |
| 2,646,784 | McKeever | July 28, 1953 |
| 2,674,401 | Mallory | Apr. 6, 1954 |
| 2,717,584 | Upton | Sept. 13, 1955 |
| 2,723,652 | Kukovac | Nov. 15, 1955 |
| 2,737,935 | Olson | Mar. 13, 1956 |
| 2,829,629 | Badertscher et al. | Apr. 8, 1958 |
| 2,884,950 | Settelmayer et al. | May 5, 1959 |
| 2,933,075 | Geffroy | Apr. 19, 1960 |
| 2,986,132 | Matz | May 30, 1961 |